(12) United States Patent
Line et al.

(10) Patent No.: US 9,168,848 B2
(45) Date of Patent: Oct. 27, 2015

(54) VEHICLE SEATING ASSEMBLY

(71) Applicant: Ford Global Technologies, LLC, Dearborn, MI (US)

(72) Inventors: Johnathan Andrew Line, Northville, MI (US); Alan George Dry, Grosse Pointe Woods, MI (US); Gunnar Groesbeck, Berkley, MI (US); John W. Jaranson, Dearborn, MI (US); Dumitru Dan Nae, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 193 days.

(21) Appl. No.: 13/893,932

(22) Filed: May 14, 2013

(65) Prior Publication Data

US 2014/0265501 A1     Sep. 18, 2014

Related U.S. Application Data

(60) Provisional application No. 61/799,055, filed on Mar. 15, 2013.

(51) Int. Cl.
*B60N 2/12* (2006.01)
*B60N 2/02* (2006.01)
*B60N 2/18* (2006.01)
(Continued)

(52) U.S. Cl.
CPC .. *B60N 2/12* (2013.01); *B60N 2/02* (2013.01); *B60N 2/0232* (2013.01); *B60N 2/1821* (2013.01); *B60N 2/2209* (2013.01); *B60N 2/2222* (2013.01); *B60N 2/3013* (2013.01); *B60N 2/3065* (2013.01); *B60N 2/36* (2013.01); *B60N 2002/024* (2013.01); *B60N 2002/0236* (2013.01)

(58) Field of Classification Search
CPC .. B60N 2/2209; B60N 2/12; B60N 2002/024; B60N 2002/0236; B60N 2/36; B60N 2/3065; B60N 2/3013; B60N 2/2222; B60N 2/1821; B60N 2/0232; B60N 2/02
USPC .......................................... 297/341, 343, 342
See application file for complete search history.

(56) References Cited

U.S. PATENT DOCUMENTS

| 5,112,018 A | 5/1992 | Wahls |
| 5,145,232 A | 9/1992 | Dal Monte |

(Continued)

FOREIGN PATENT DOCUMENTS

EP          0511100       10/1992

OTHER PUBLICATIONS

Recaro, Printed Oct. 10, 2012, "Recaro Orthoped: Unlike Any Other Seat," Recaro Automotive Website, http://www.recaro-automotive.com/us/product-areas/aftermarket-seats/product/orthoped.html.

(Continued)

*Primary Examiner* — Milton Nelson, Jr.
(74) *Attorney, Agent, or Firm* — Vichit Chea; Price Heneveld LLP

(57) ABSTRACT

A vehicle seating assembly includes a seatback having a panel movable to a reclined position and a cushion slidably coupled with the panel to slide down in the reclined position. A base is pivotally supporting the panel and has a concave portion. A seat has a bottom portion slidably coupled with the concave portion for sliding the seat to an upward angle when the panel moves to the reclined position.

20 Claims, 10 Drawing Sheets

(51) Int. Cl.
*B60N 2/22* (2006.01)
*B60N 2/30* (2006.01)
*B60N 2/36* (2006.01)

(56) References Cited

U.S. PATENT DOCUMENTS

| | | |
|---|---|---|
| 5,244,252 A | 9/1993 | Serber |
| 5,979,985 A | 11/1999 | Bauer et al. |
| 7,140,682 B2 | 11/2006 | Jaeger et al. |
| 7,780,230 B2 * | 8/2010 | Serber ............... 297/216.15 |
| 8,061,755 B2 | 11/2011 | Brendel et al. |
| 2003/0178877 A1 | 9/2003 | Schmale |
| 2012/0104819 A1 | 5/2012 | Line et al. |

OTHER PUBLICATIONS

Cobospa, Printed Oct. 10, 2012, "Index by Application," Cobospa Website, http://www.cobospa.it/catalogo/zz_ing/sedili/tabsedili.htm.

* cited by examiner

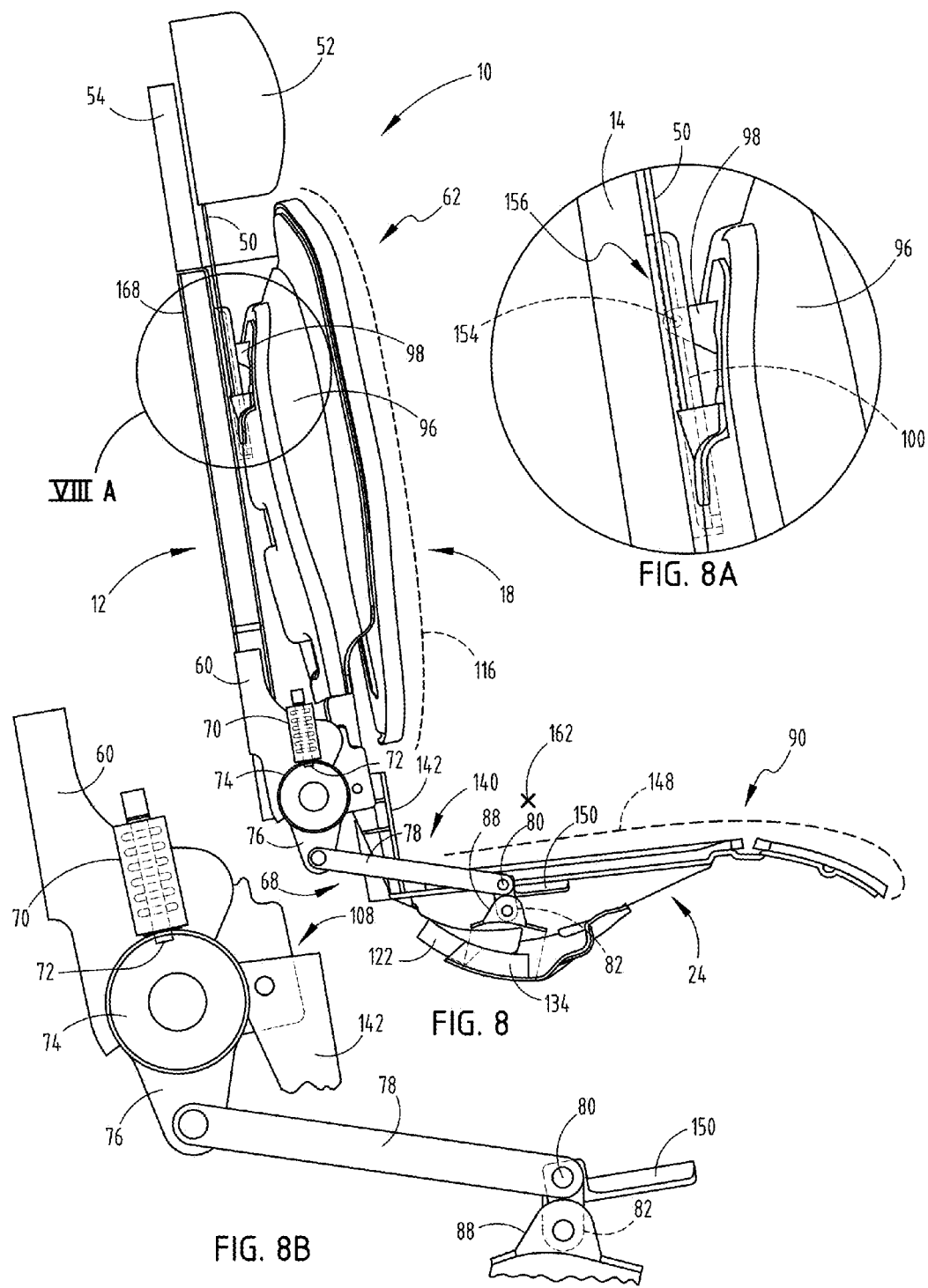

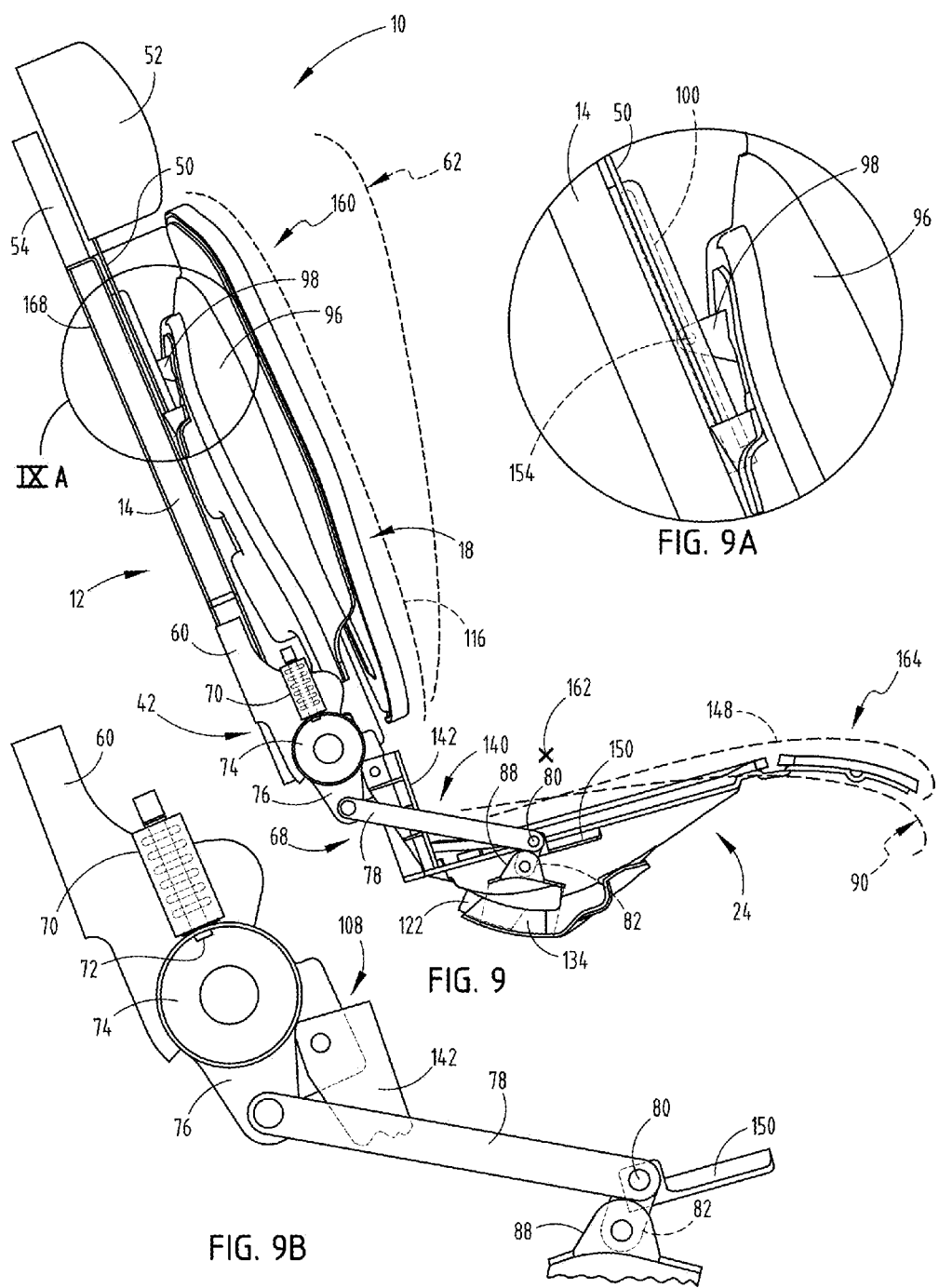

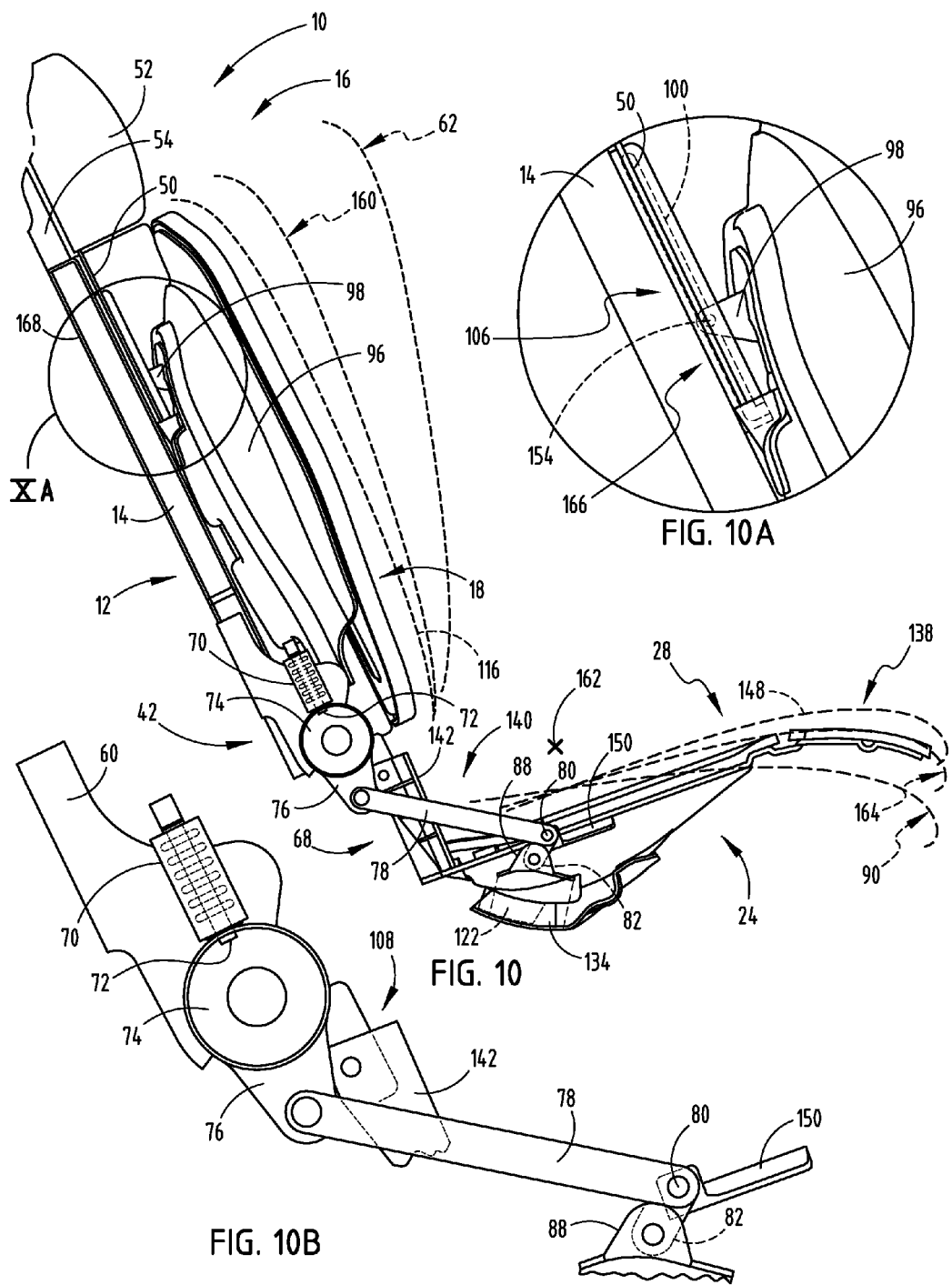

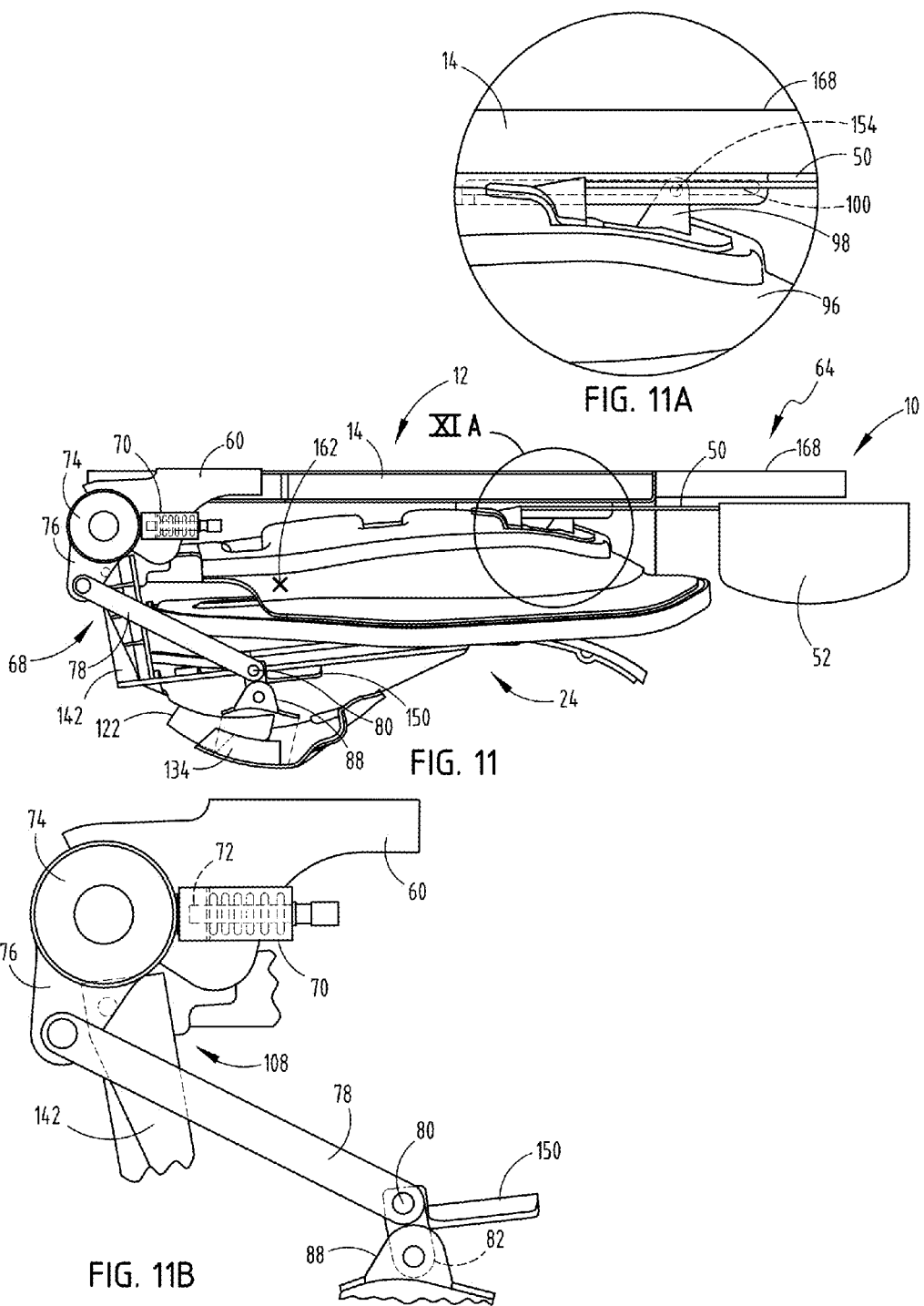

VEHICLE SEATING ASSEMBLY

CROSS REFERENCE TO RELATED APPLICATION

The present application claims the benefit under 35 USC §119(e) of provisional application Ser. No. 61/799,055, filed Mar. 15, 2013, entitled VEHICLE SEATING ASSEMBLY, the entire contents of which are incorporated herein by reference.

FIELD OF THE INVENTION

The present invention generally relates to a seating assembly, and more particularly to a vehicle seating assembly that is adjustable for occupant comfort.

BACKGROUND OF THE INVENTION

It is common for vehicles to include seating assemblies that have seatbacks capable of moving to reclined positions. Typically, upon moving to the reclined position, the seat portion of the seating assembly generally remains stationary and the seatback portion pivots rearward, requiring ample area behind the seating assembly for moving to the reclined position. Accordingly, seating assemblies capable of moving to reclined positions are located in a front row or mid row of seating, not in rear rows of seating due to space constraints. In addition, it is desired to maximize useable space in all vehicle seat locations, as vehicles are increasingly being reduced in size to decrease vehicle weight and increase vehicle efficiency.

SUMMARY OF THE INVENTION

According to one aspect of the present invention, a vehicle seating assembly includes a seatback having a panel movable to a reclined position and a cushion slidably coupled with the panel to slide down in the reclined position. A base is pivotally supporting the panel and has a concave portion. A seat has a bottom portion slidably coupled with the concave portion for sliding the seat to an upward angle when the panel moves to the reclined position.

According to another aspect of the present invention, a vehicle seating assembly includes a seat having a sliding feature protruding downward. A base slidably supports the sliding feature. A seatback panel is coupled with the base and is pivotal to a reclined position. A linkage is coupled between the seatback panel and the seat for sliding the seat forward on the base to an upward angled position when the seatback panel pivots to the reclined position.

According to yet another aspect of the present invention, a vehicle seating assembly includes a seat having a bottom portion with longitudinal sliding features. A base has concave guide elements coupled with the sliding features. A seatback has a panel pivotal between upright and reclined positions and a cushion slidably coupled with the panel. A connector pivotally couples the seat with the cushion for sliding the cushion down when the seat slides forward on the base to an upward angled position.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 2A is an enlarged top perspective view of a recliner bracket and a linkage of the seating assembly;

FIG. 8 is a side elevational view of the seating assembly, having the seatback in an upright position and the seat in a rearward position;

FIG. 8A is an enlarged side elevational view of a track assembly of the seatback, taken at VIIIA in FIG. 8;

FIG. 8B is an enlarged side elevational view of the linkage of the seating assembly, as shown in FIG. 8;

FIG. 9 is a side elevational view of the seating assembly, having the seatback in an intermediate reclined position and the seat in an intermediate forward position;

FIG. 9A is an enlarged side elevational view of the track assembly of the seatback taken at IXA in FIG. 9;

FIG. 9B is an enlarged side elevational view of the linkage of the seating assembly, as shown in FIG. 9;

FIG. 10 is a side elevational view of the seating assembly, having the seatback in a reclined position and the seat in a forward position;

FIG. 10A is an enlarged side elevational view of the track assembly of the seatback taken at XA in FIG. 10;

FIG. 10B is an enlarged side elevational view of the linkage of the seating assembly, as shown in FIG. 10;

FIG. 11 is a side elevational view of the seating assembly in a stowed position;

FIG. 11A is an enlarged side elevational view of the track assembly of the seatback taken at XIA in FIG. 11; and FIG. 11B is an enlarged side elevational view of the linkage of the seating assembly, as shown in FIG. 11.

DETAILED DESCRIPTION OF THE PREFERRED EMBODIMENTS

Figure 1:
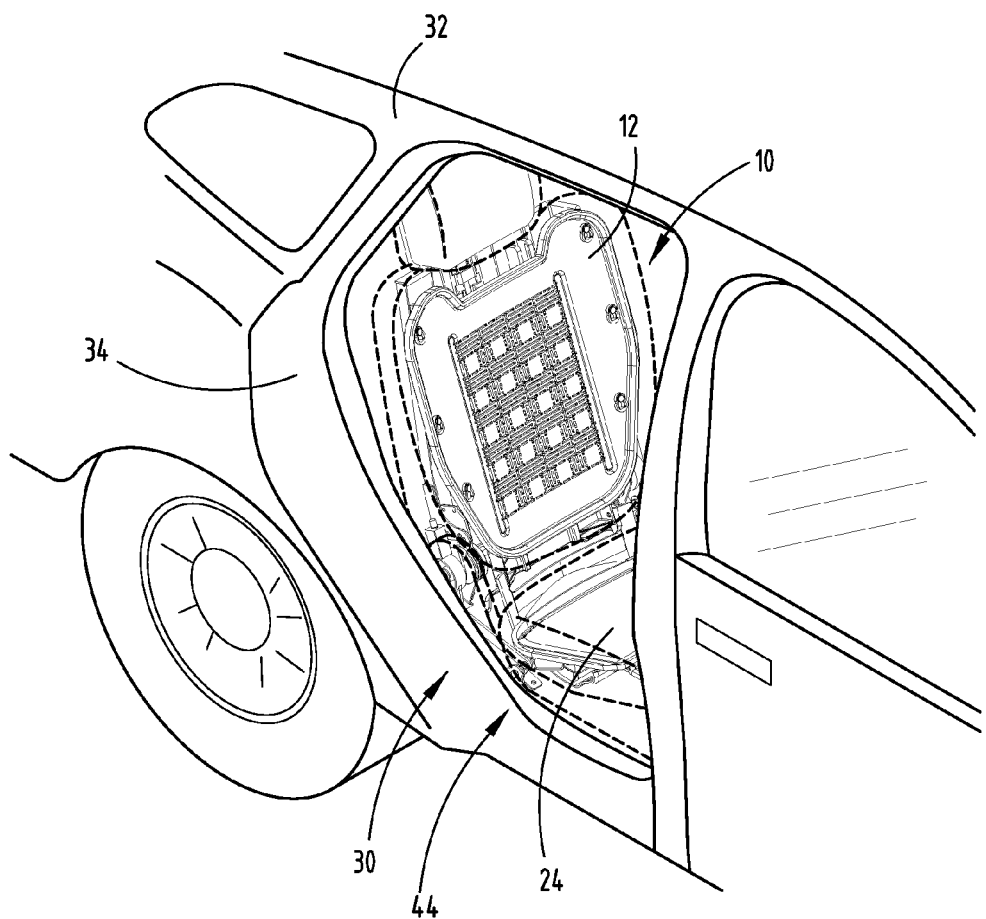
FIG. 1 is a top perspective view of one embodiment of a seating assembly positioned in a rear row of a vehicle.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-11B, reference numeral 10 generally designates a seating assembly that includes a seatback 12 having a panel 14 movable to a reclined position 16 and a cushion 18 slidably coupled with the panel 14 to slide down in the reclined position 16. A base 20 is pivotally supporting the panel 14 and has a concave portion 22. A seat 24 has a bottom portion 26 slidably coupled with the concave portion 22 for sliding the seat 24 to an upward angle 28 when the panel 14 moves to the reclined position 16.

Figure 2:
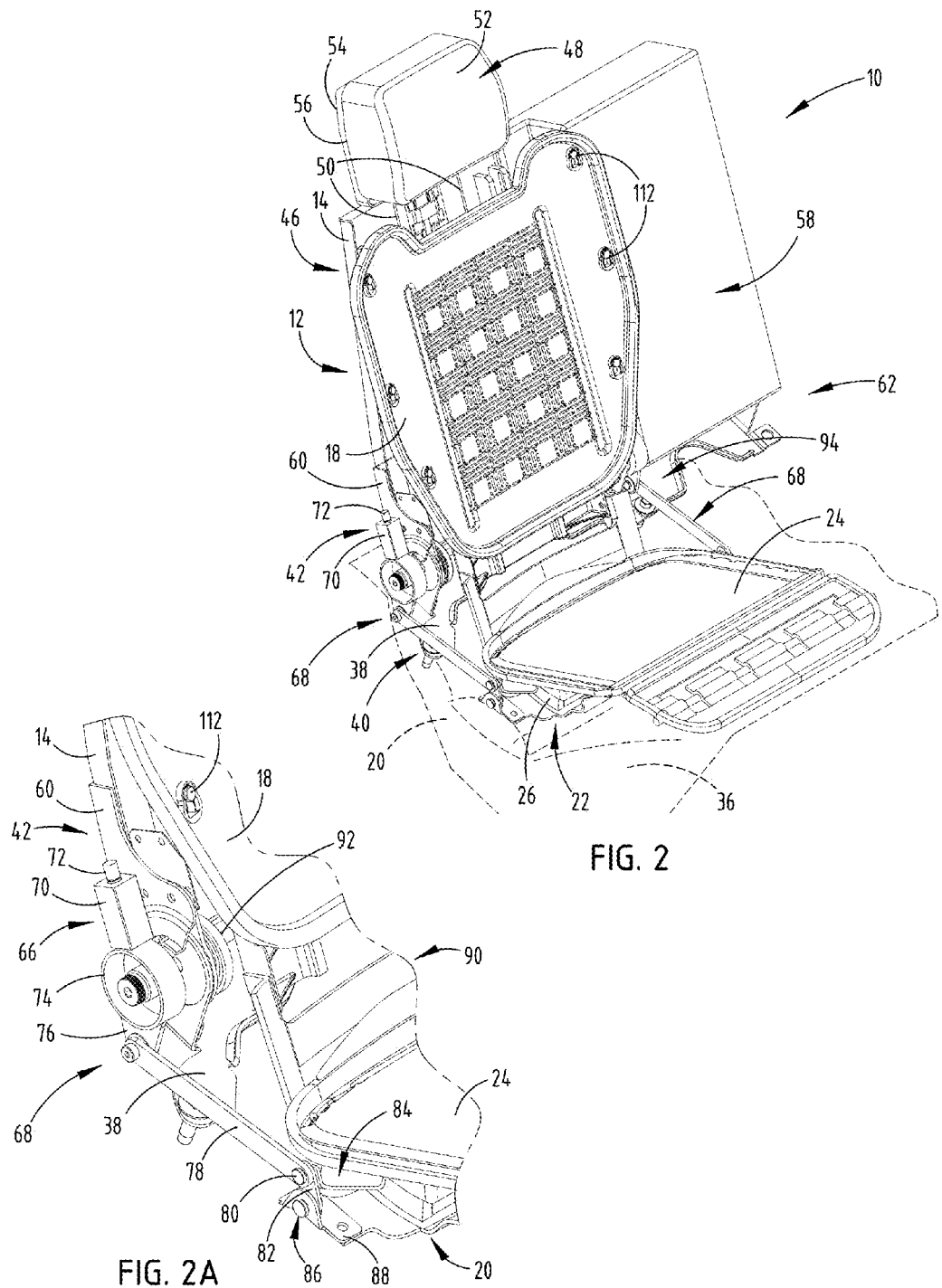
FIG. 2 is a top perspective view of the seating assembly.

Referring to the embodiment illustrated in FIG. 1, the seating assembly 10 is positioned as part of a rear row of seating 30 within a vehicle 32. The rear row of seating 30 extends laterally within the vehicle 32 from a rear side door opening 34 of the vehicle 32 to an opposing rear side door opening 34 on an opposing side of the vehicle 32. The rear row of seating 30 includes at least one seating assembly 10, and typically includes a 60-40 division or a 40-20-40 division. The 40-20-40 division may include two seating assemblies 10 and a center seat that is stationary relative to the seating assemblies 10. In illustrated embodiment, as shown in FIG. 2, the seating assembly 10 is configured on the sixty percent portion of a 60-40 division of the rear row of seating 30. The rear door opening 34 is shown with a rear door removed to illustrate the general position of the seating assembly 10, according to one embodiment. It is contemplated the seating assembly 10 may be alternatively arranged in a different row arrangement and disposed in various alternative locations throughout the vehicle 32, such as a front row of seating or a mid-row of seating. It is also conceivable the vehicle 32 may include other vehicle types from that illustrated, such as a car, a sport utility vehicle, a truck, and other vehicle types, as generally understood by one having ordinary skill in the art.

As shown in FIG. 2, the seating assembly 10 is coupled with a rear floor 36 of the vehicle 32 that extends upward and rearward from a foot well to span beneath the seat 24 of the seating assembly 10. A recliner bracket 38 is coupled with a base portion 20 of the rear floor 36 proximate an outer edge 40 of a lower region 42 of the seatback 12. The recliner bracket 38 extends upward from the base portion 20 to pivotally support the panel 14 of the seatback 12. The panel 14 is configured to be disposed between a cargo area or trunk area of the vehicle 32 and the cushion 18 portion of the seatback 12, generally dividing the cargo or trunk area from a passenger area 44 of the vehicle 32 (FIG. 1). It is contemplated that the panel 14 may otherwise be disposed at an alternative location within the vehicle 32, such as a rearward portion of the passenger compartment. In addition, it is conceivable that the base portion 20 may include alternative supportive structures from the floor of the vehicle 32.

As also shown in FIG. 2, an upper region 46 of the seatback 12 includes a head restraint 48 that is slidably supported by the panel 14. More specifically, a pair of support rods 50 extend down from a body portion 52 of the head restraint 48 to slidably engage the panel 14. In addition, a rear support member 54 extends upward from the panel 14 along a rear surface 56 of the body portion 52 of the head restraint 48. In the illustrated embodiment, the rear panel extends laterally inboard from the cushion 18 to occupy a central seat 58 of the rear row of seating 30, thereby defining a sixty percent portion of the rear row of seating 30. It is, however, contemplated that the rear panel may not include a lateral extension for the central seat 58, such that the panel 14 may merely occupy the region rearward the cushion 18 of the seatback 12. Further, it is conceivable that the panel 14 may not slidably support or otherwise include a head restraint 48.

Referring to FIGS. 2-2A, the recliner bracket 38 pivotally couples with and supports a lower member 60 of the panel 14 to allow the panel 14 to pivot about the recliner bracket 38 between the illustrated upright position 62, the reclined position 16, and a stowed position 64, as described in more detail below. A locking mechanism 66 is attached to an outer surface of the lower member 60 of the panel 14 and removably engages a linkage 68 that couples between the panel 14 and the seat 24. The linkage 68 operates to slide the seat forward on the base 20 to the upward angled position 28 when the panel 14 pivots to the reclined position 16. More specifically, the locking mechanism 66 has a spring loaded actuator 70 with a pin 72 that removably engages a cylinder 74 of the linkage 68. The cylinder 74 is pivotally coupled about a rotational connection on the recliner bracket 38 and includes a tab 76 that integrally extends downward from the cylinder 74 to pivotally couple with a push bar 78. The push bar 78 of the linkage 68 longitudinally extends forward to pivotally couple with an upper end 80 of an actuation link 82 and an intermediate portion 84 of the seat 24. A lower end 86 of the actuation link 82 is pivotally coupled with and supported by a seat bracket 88. The seat bracket 88 is coupled with the base portion 20 of the floor 36 laterally adjacent to the intermediate portion 84 of the seat 24. Movement of the upper end 80 of the actuation link 82 operates to assist the seat 24 to move between the illustrated rearward position 90 and the forward or upward angled position 28. Accordingly, when the pin 72 of the locking mechanism 66 is engaged with the cylinder 74, pivotal movement of the seatback 12 causes the push rod to pivot the actuation link 82 forward to slide the seat 24 between the rearward and forward positions 90, 28. The spring loaded actuator 70 of the locking mechanism 66 may be depressed to release the pin 72 from engagement with the cylinder 74 to allow the panel 14 of the seatback 12 to rotate independently from the linkage 68 and the seat 24, such as to the stowed position 64.

As further illustrated in FIGS. 2-2A, the inner side surface of the recliner bracket 38 includes a recliner heart 92 that removably engages the lower member 60 of the panel 14 and is movable between locked and unlocked positions. In the locked position, the panel 14 is prevented from pivoting about the recliner bracket 38. And accordingly, in the unlocked position the panel 14 and seatback 12 are permitted to pivot between the upright, reclined, and stowed positions 62, 16, 64, as described in more detail below. In addition, an opposing side 94 of the seat 24 includes a substantially mirror image recliner bracket 38, recliner heart 92, and linkage 68 coupled between the panel 14 and the seat 24, having like reference numerals. However, it is contemplated that the seating assembly 10 may include only a single linkage 68 and recliner heart 92, or multiple, or alternatively oriented linkages and recliner hearts.

Figure 3:
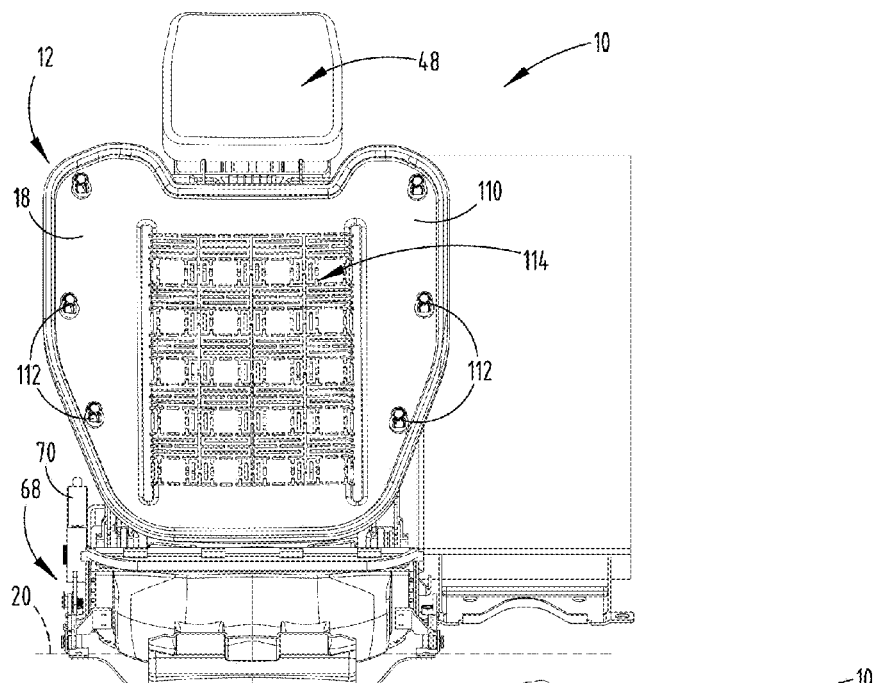
FIG. 3 is a front elevational view of the seating assembly.
Figure 4:
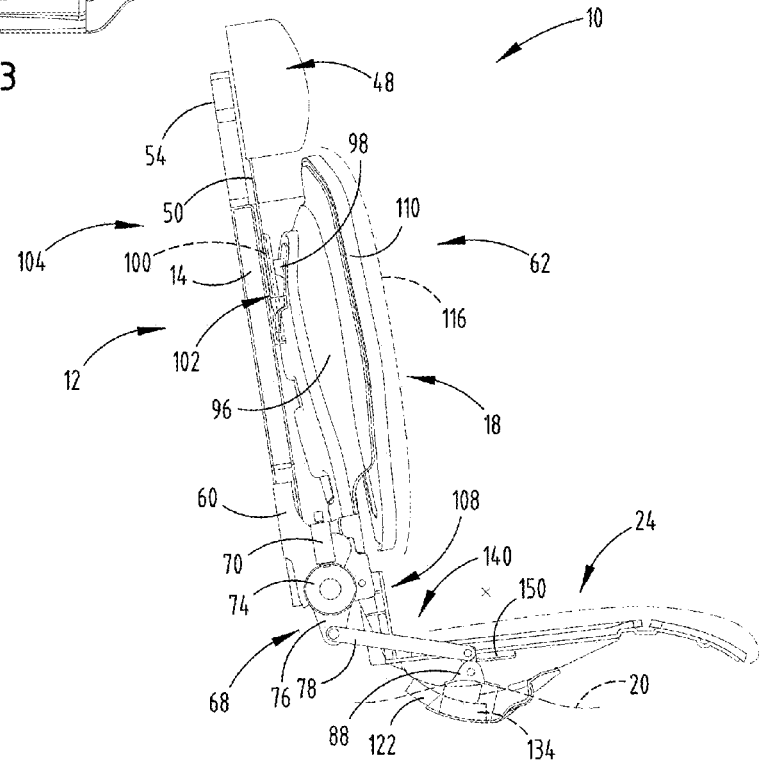
FIG. 4 is a side elevational view of the seating assembly.

The seatback 12, as shown in FIGS. 3-4, also includes the cushion 18 that is slidably coupled with and extends forward from the panel 14. The cushion 18 includes a rear shell 96 that has a flange 98 extending rearward to slidably engage a slot 100 formed on the panel 14 of the seatback 12. The flange 98 and the slot 100 define a track assembly 102 coupled between the cushion 18 and the panel 14 for vertically sliding the cushion 18 between a top position 104, as illustrated with the seatback 12 in the upright position 62, and a bottom position 106, as further described below. At the lower portion of the rear shell 96, a connector 108 pivotally couples with the seat 24 for sliding the cushion 18 down on the panel 14 when the seat 24 slidably moves forward on the base portion 20. A cushion carrier 110 is coupled with a periphery of the rear shell 96 about a series of detachable connectors 112. The cushion carrier 110 has a central portion 114 that includes a matrix of resilient elements for flexibly supporting a back of an occupant. The cushion carrier 110 has a flexible cushion 116, such as a foam material or a woven matrix of flexible fibers, which is disposed over a forward surface of the cushion carrier 110, as shown in dashed lines in FIG. 4. The flexible cushion 116 includes a pliable trim piece, such as a leather or fabric material, as generally understood in the art, for covering and defining the back support surface of the seatback 12.

Figure 5:
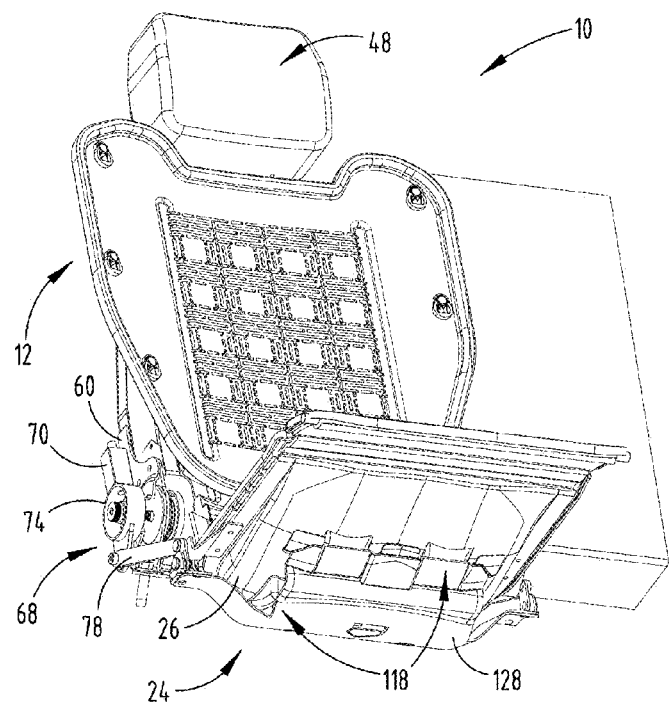
FIG. 5 is a bottom perspective view of the seating assembly.
Figure 5A:
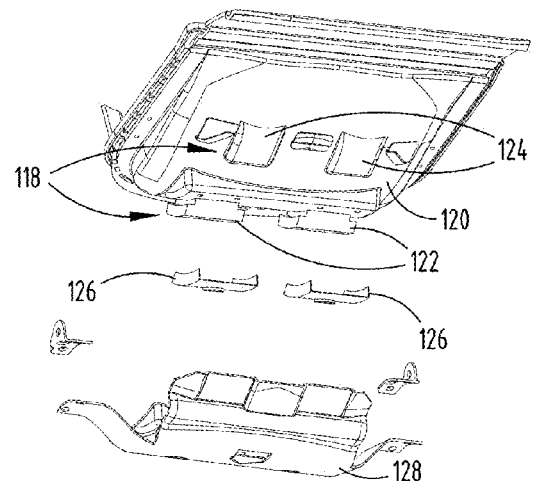
FIG. 5A is an exploded bottom perspective view of a seat of the seating assembly.

The bottom portion 26 of the seat 24, as shown in FIGS. 5-5A, has longitudinal sliding feature 118 extending downward from a lower surface 120 of the bottom portion 26. The lower surface 120 of the bottom portion 26 has a downward protruding convex shape. The sliding feature 118 includes a pair of T-shaped protrusions 122 that extend downward from the lower surface 120 in lateral alignment with each other. The T-shaped protrusions 122 extend longitudinally on the lower surface 120 following the convex curvature of the bottom portion 26 of the seat 24. The sliding feature 118 also includes a pair of angled wedge members 124 integrally extending down from the lower surface 120 in front of the T-shaped protrusions 122. The sliding feature 118 also includes a pair of slide shrouds 126 that overlay the wedge members 124 to reduce friction in the sliding movement of the seat 24. A support bracket 128 that fixedly couples with the base portion 20 of the floor is positioned below the sliding feature 118 and has a concave shape to correspond to the convex shape of the seat 24 and sliding feature 118.

Figure 6:
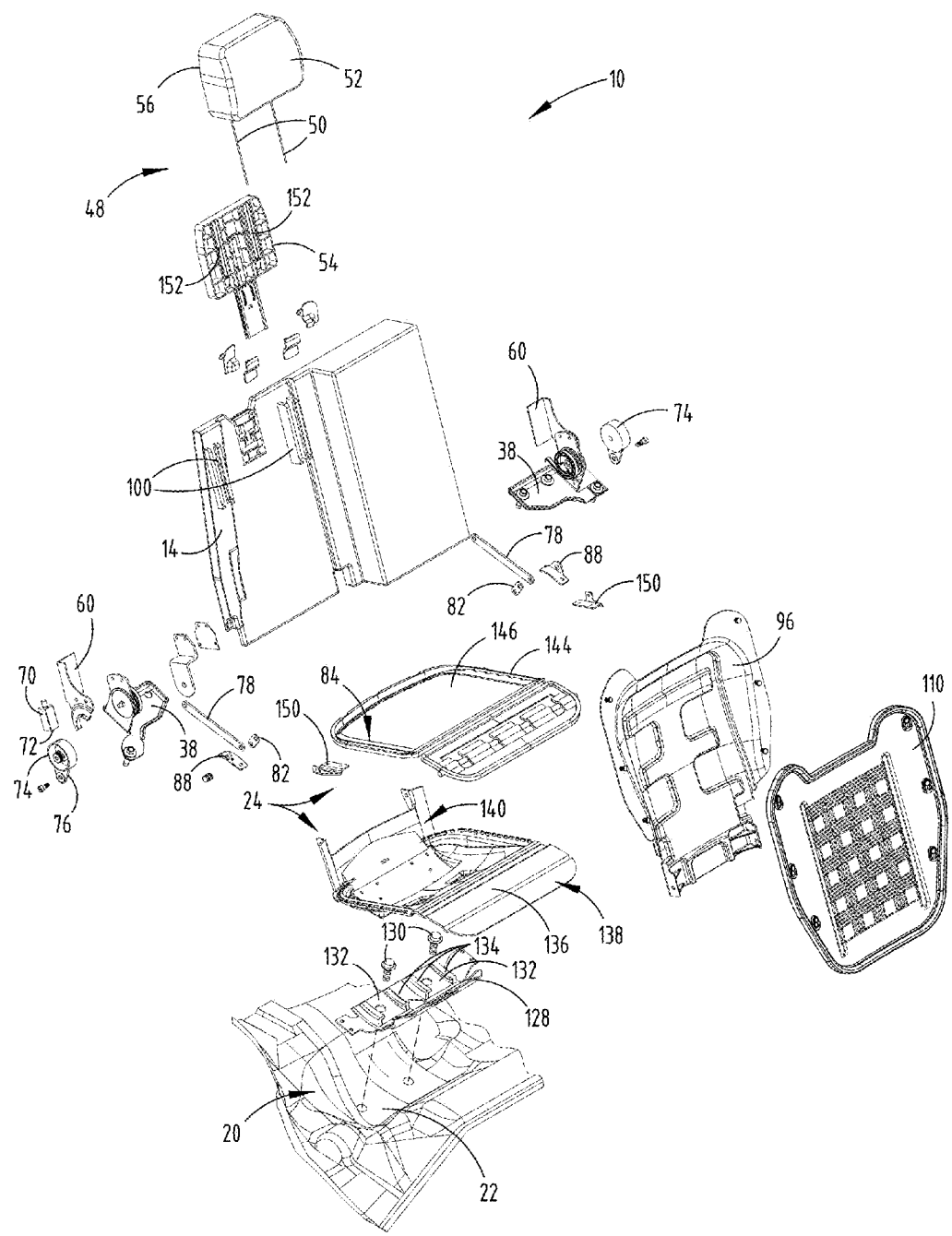
FIG. 6 is an exploded top perspective view of the seating assembly.

As illustrated in FIG. 6, the base 20 includes the support bracket 128 that is fixedly coupled with the concave portion 22 of the base 20 by a pair of fasteners 130. More specifically, the concave portion 22 has a laterally extending valley formed in the upward facing surface of the floor portion with a shape corresponding with the support bracket 128 and the convex shape of the seat 24. The support bracket 128 has a guide element 132 protruding upward with L-shaped side members 134 that slidably engage opposing sides of the T-shaped protrusions 122 on the bottom portion 26 of the seat 24. It is conceivable that the sliding feature 118 and guide elements 132 may alternatively include a roller bearing surface, a curved track assembly 102, or other alternative arcuate sliding arrangements.

As also shown in FIG. 6, the bottom portion 26 of the seat 24 has a substantially bowl shape that provides an anti-submarining front edge 136 laterally extending along a front portion 138 of the seat 24. A rear portion 140 of the seat 24 has an upward protruding flange 142 that is configured to engage the lower portion of the rear shell 96 of the seatback 12 about the connector 108. A halo member 144 is coupled around the peripheral edge of the bottom portion 26 of the seat 24 and includes a flexible webbing 146 spanning across and substantially occupying a central opening of the halo member 144. The flexible webbing 146 is configured to flex inward into the upper bowl shaped portion of the seat 24 to provide flexible support to the buttock region of an occupant. Similar to the seatback 12, a flexible cushion 148 covered with a pliable trim piece, such as a leather or fabric material over a foam material or a woven matrix of flexible fibers, is disposed over the flexible webbing 146 of the seat 24, as shown in dashed lines in FIG. 8. Again, it is contemplated that various cushion arrangements may be employed over the seat 24, as generally understood in the art.

Figure 7:
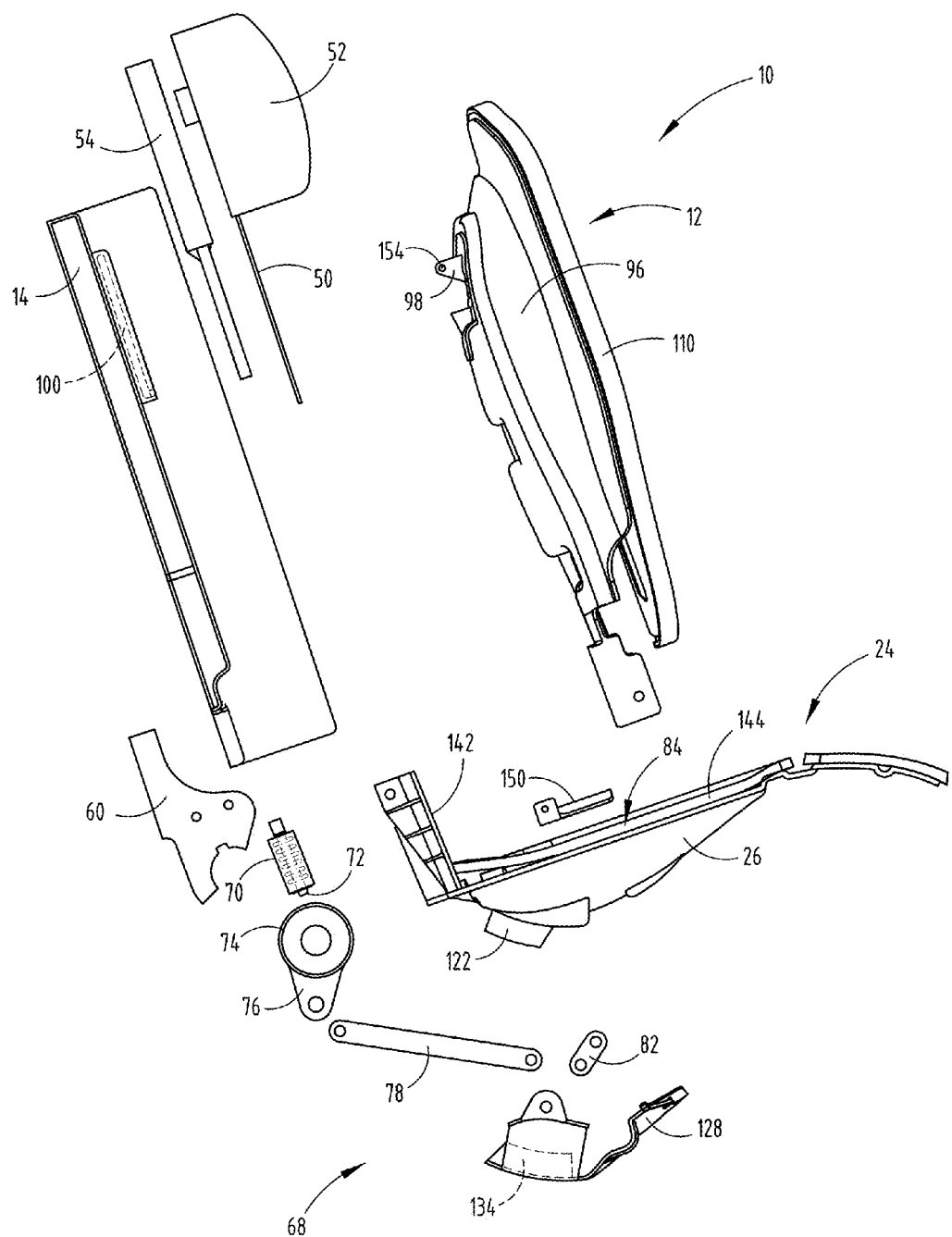
FIG. 7 is an exploded side elevational view of the seating assembly.

As further illustrated in FIGS. 6-7, a pivot bracket 150 is coupled between the bottom portion 26 of the seat 24 and the halo member 144 proximate the intermediate portion 84 of the edge of the seat 24. The pivot bracket 150 is arranged to pivotally couple with the actuation link 82 of the linkage 68, and thereby engage the seat 24 with the seatback 12. Accordingly, the pivot bracket 150 is fixedly coupled with the seat 24 and provides a pivot point for the linkage 68 to manipulate the seat 24 between the rearward and forward positions 90, 28, as explained in more detail below. As also illustrated in FIG. 6, the body portion 52 of the head restraint 48 engages a vertical channel 152 in the rear support member 54 that allows the seatback 12 to simultaneously draw the body portion 52 of the head restraint 48 downward when the cushion 18 of seatback 12 slides downward on the panel 14. It is also contemplated that the head restraint 48 may remain fixed relative to the panel 14.

As shown in FIGS. 8-8B, the seating assembly 10 has the seatback 12 in the upright position 62 and the seat 24 in the rearward position 90 relative to the support bracket 128 that is coupled with the base portion 20 of the rear floor 36. The flange 142 of the track assembly 102 extends rearward from the rear shell 96 of the seatback 12 and includes a lateral protrusion 154 that slidably engages the vertical slot 100 on the panel 14. With the seatback 12 in the upright position 62 and the seat 24 in the rearward position 90, the lateral protrusion 154 of the track assembly 102 is positioned at an upper intermediate extent 156 of the slot 100, defining the cushion 18 in the top position 104. Also, the pivot bracket 150 on the seat 24 has a generally horizontal orientation and is in generally perpendicular alignment with the actuation link 82 of the linkage 68. Accordingly, the actuation link 82 has a generally vertical orientation with the seat 24 in the rearward position 90 and the seatback 12 in the upright position 62. It is, however, contemplated that the seat 24 may have a slight incline in the rearward position 90 or other alternative angles and orientations relative to the seatback 12 and floor portion of the vehicle 32 to provide a comfortable sitting surface. In addition, it conceivable that the upright position 62 of the seatback 12 may include alternative angles and orientations relative to the seat 24.

Referring now to FIGS. 9-9B, the seatback 12 is moved to an intermediate reclined position 160, whereby the panel 14 pivots rearward about the recliner bracket 38. The push bar 78 is transitioned forward by the tab 76 extending from the recliner bracket 38 to move the upper end 80 of the actuation link 82 forward about the seat bracket 88. In turn, the pivot bracket 150 applies a forward force to the seat 24 to slide the sliding elements forward on the guide elements 132. With the concave curvature of the base portion 20 and the guide elements 132, the forward sliding movement of the seat 24 rotates the seat about a virtual H-point 162 to an intermediate upward angle 164. The virtual H-point 162 corresponds with an approximate area of a hip point of a seated occupant, such that rotation about the H-point 162 provides added comfort to an occupant during movement of the seat 24, as the occupant's thighs and knees are raised about a natural pivot location. Accordingly, the rotation of the seat 24 causes connector 108 between the rear portion 140 of the seat 24 and the lower region 42 of the seatback 12 to draw the cushion 18 portion of the seatback 12 downward relative to the panel 14. The downward movement of the cushion 18 portion is effectuated by the lateral protrusion 154 of the track assembly 102 moving down in the vertical slot 100 on the panel 14. Therefore, the rotation of the seat 24 about the virtual H-point 162 also provides the occupant with experiencing reduced movement between the back support surface of the seatback 12 and the occupant's back surface.

As illustrated in FIGS. 10-10B, the seatback 12 is pivoted further rearward about the recliner bracket 38 to the reclined position 16. Again, further reclining of the seatback 12 causes the push bar 78 to urge the upper end 80 of the actuation link 82 to a more forward angle and to thereby slide the seat 24 around the virtual H-point 162 to the forward position 28, having an upward angled orientation. As such, the front portion 138 of the seat 24 is raised and the rear portion 140 of the seat 24 is lowered when the seat 24 slides forward to the upward angled position 28. The connector 108 between the rear portion 140 of the seat 24 and the lower portion of the cushion 18 further draws the cushion 18 portion of the seatback 12 downward to the bottom position 106. In the bottom position, the lateral protrusion 154 of the track assembly 102 is located in a lower intermediate portion 166 of the vertical slot 100 on the panel 14. The track assembly 102 also generally provides forward and rearward longitudinal support between the upper portion of the cushion 18 and the panel 14 of the seatback 12. Also, downward movement of the cushion 18 simultaneously draws the body portion 52 of the head restraint 48 downward. With the seat 24 in the upward angled position 28, the actuation link 82 is angled forward and the pivot bracket 150 on the seat 24 has a more inclined orientation from the seat 24 in the rearward position 90. Again, it is contemplated that the reclined position of the seatback 12 and the forward position of the seat 24 may include alternative angles and orientations relative to the base support and floor portion of the vehicle 32.

As shown in FIGS. 11-11B, the seating assembly 10 may also be moved to the stowed position 64, whereby the seatback 12 is rotated forward about the recliner bracket 38 to place a rearward surface 168 of the panel 14 in substantially horizontal alignment. To allow the seatback 12 to move independently from the linkage 68 and the seat 24, the locking mechanism 66 is actuated by disengaging the pin 72 from the cylinder 74. This provides the seatback 12 the ability to pivot forward about the recliner bracket 38, revolving around the axis of the cylinder 74 to rotate the panel 14 to a generally horizontal orientation. Accordingly, the rearward surface 168 of the panel 14 may be used for supporting an object, such as a cargo item, when the seating assembly 10 is moved to the stowed position 64.

It is understood that the seating assembly 10 may be adjusted between the illustrated and described positions by reversing the steps described above, to place the seating assembly 10 in the initial positions, including placing the seatback 12 in the reclined position 16, the intermediate reclined position 160, and the upright position 62 and placing the seat in the forward and rearward positions 28, 90. It is also contemplated that the seatback 12 may be reclined independently from movement of the linkage 68 and the seat 24. And further, it is conceivable that the linkage 68 may be arranged with a motorize mechanism to articulate the seat 24 between the forward and rearward position 28, 90, independently from the reclining movements of the seatback 12. Accordingly, the occupant may adjust the angle of the seatback 12 to allow for further customizable adjustment of the seating assembly 10 for the comfort of the occupant.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structure without departing from the concepts of the present invention, and further it is to be understood that such concepts are intended to be covered by the following claims unless these claims by their language expressly state otherwise.

We claim:

1. A vehicle seating assembly, comprising:
   a seatback including a panel movable to a reclined position and a cushion slidably coupled with the panel to slide down in the reclined position;
   a base pivotally supporting the panel and having a concave portion;
   a seat having a bottom portion slidably coupled with the concave portion;
   an actuation link pivotally coupled to the base;
   a cylinder having a tab coupled to the seatback; and
   a push bar pivotally coupled to the tab and the actuation link for sliding the seat to an upward angle when the panel moves to the reclined position.

2. The vehicle seating assembly of claim 1, wherein the concave portion includes a guide element and the bottom portion of the seat includes a longitudinal sliding feature extending down to slidably couple with the guide element.

3. The vehicle seating assembly of claim 1, wherein a rear portion of the seat is lowered when the seat slides on the concave portion from a rearward position to an upward angled position, and wherein the rear portion of the seat is coupled with the cushion to draw the cushion downward relative to the panel when the seat moves to the upward angled position.

4. The vehicle seating assembly of claim 1, further comprising:
   a recliner bracket coupled with the base and pivotally coupled with the panel, wherein the panel is pivotal about the recliner bracket between upright and reclined positions.

5. The vehicle seating assembly of claim 1, further comprising:
  a track assembly coupled between the cushion and the panel for sliding the cushion portion vertically between a top position and a bottom position.

6. The vehicle seating assembly of claim 5, wherein the cushion is in the top position when the seat is in a rearward position on the concave portion and the cushion is slid downward to the bottom position when the seat slides forward on a guide element to an upward angled position.

7. A vehicle seating assembly, comprising:
  a seat having a sliding feature protruding downward;
  a base slidably supporting the sliding feature;
  a seatback panel coupled with the base and pivotal to a reclined position;
  a linkage coupled between the seatback panel and the seat; and
  an actuator with a pin that removably engages a cylinder of the linkage for sliding the seat forward on the base to an upward angled position when the seatback panel pivots.

8. The vehicle seating assembly of claim 7, wherein the base includes a concave portion to rotate the seat about a virtual H-point above the seat when the seat slides between a rearward position and the upward angled position.

9. The vehicle seating assembly of claim 7, wherein a front portion of the seat is raised and a rear portion of the seat is lowered when the seat slides forward to the upward angled position.

10. The vehicle seating assembly of claim 7, wherein the base includes a vehicle floor and a support bracket having a concave guide element, wherein the sliding feature slidably couples with the concave guide element.

11. The vehicle seating assembly of claim 7, further comprising:
  a cushion disposed over and slidably coupled with the seatback panel, wherein the cushion is coupled with a rear portion of the seat to move the cushion down when the seat slides to the upward angled position.

12. The vehicle seating assembly of claim 11, further comprising:
  a track assembly coupled between the cushion and the seatback panel for sliding the cushion vertically between a top position when the seat is in a rearward position and a bottom position when the seat slides to the upward angled position.

13. The vehicle seating assembly of claim 7, further comprising:
  a recliner bracket coupled with the base and extending upward to pivotally support the seatback panel, wherein the seatback panel is pivotal between upright and reclined positions.

14. The vehicle seating assembly of claim 13, further comprising:
  a recliner mechanism coupled between the recliner bracket and the seatback panel and movable between locked and unlocked positions, wherein the locked position prevents the seatback panel from pivoting between the upright and reclined positions.

15. A vehicle seating assembly, comprising:
  a seat having a bottom portion with longitudinal sliding features;
  a base having concave guide elements coupled with the sliding features;
  a seatback having a panel pivotal between upright and reclined positions and a cushion slidably coupled with the panel; and
  a connector pivotally coupling seat with the cushion for sliding the cushion down when the seat slides forward, wherein the connector is disposed forwardly of the panel.

16. The vehicle seating assembly of claim 15, wherein the bottom portion of the seat includes a convex shape in general alignment with the concave guide elements, and wherein the convex shape slides around a virtual H-point when the seat slides between a rearward position and the upward angled position.

17. The vehicle seating assembly of claim 15, wherein the cushion of the seatback includes a shell and a cushion carrier coupled with a periphery of the shell.

18. The vehicle seating assembly of claim 17, further comprising:
  a track assembly coupled between the shell and the panel for sliding the cushion vertically between a top position and a bottom position, wherein the cushion moves to the bottom position when the seat is moved to an upward angled position.

19. The vehicle seating assembly of claim 15, further comprising:
  a linkage coupled between the panel and the seat for sliding the seat forward on the base to an upward angled position when the panel pivots to the reclined position.

20. The vehicle seating assembly of claim 19, further comprising:
  a recliner bracket coupled with the base and extending upward to pivotally support the panel of the seatback;
  a recliner mechanism coupled between the recliner bracket and the panel and movable between locked and unlocked positions, wherein the locked position prevents the seat from sliding between a rearward position and the upward angled position.

* * * * *